(12) United States Patent
Lehtimäki

(10) Patent No.: US 10,936,023 B2
(45) Date of Patent: Mar. 2, 2021

(54) ELECTRONIC APPARATUS AND A TRANSFER METHOD

(71) Applicant: Bittium Wireless Oy, Oulu (FI)

(72) Inventor: Toni Lehtimäki, Oulu (FI)

(73) Assignee: Bittium Wireless Oy, Oulu (FI)

( * ) Notice: Subject to any disclaimer, the term of this patent is extended or adjusted under 35 U.S.C. 154(b) by 129 days.

(21) Appl. No.: 16/276,595

(22) Filed: Feb. 14, 2019

(65) Prior Publication Data
US 2020/0264677 A1    Aug. 20, 2020

(51) Int. Cl.
*G06F 1/18* (2006.01)
*G06F 9/30* (2018.01)
*H02J 50/10* (2016.01)
*H01R 13/02* (2006.01)

(52) U.S. Cl.
CPC ............ *G06F 1/182* (2013.01); *G06F 9/3004* (2013.01); *H01R 13/02* (2013.01); *H02J 50/10* (2016.02)

(58) Field of Classification Search
None
See application file for complete search history.

(56) References Cited

U.S. PATENT DOCUMENTS

| | | | | |
|---|---|---|---|---|
| 2002/0180344 A1* | 12/2002 | Lichtfuss | .......... | G02F 1/133305 313/498 |
| 2014/0306518 A1* | 10/2014 | Paronetto | .................. | B62J 1/12 307/9.1 |

* cited by examiner

*Primary Examiner* — Cassandra F Cox
(74) *Attorney, Agent, or Firm* — FisherBroyles, LLP

(57) ABSTRACT

An electronic apparatus includes a case that protects contents of the electronic apparatus from external mechanical impacts and/or electric disturbance, and two or more parts of electrically conductive material electrically insulated from each other. The two or more parts are electrically coupled with electric circuitry of the electronic apparatus. A first of the two or more parts has at least one electric contact area on an outer surface of the first of the two or more parts, and a second of the two or more parts has at least one electric contact area on the outer surface of the second of the two or more parts. The electric contact areas are configured to electrically couple with external counterpart contact areas for electric signals, electric energy, and/or electric data transfer to and/or from the electronic apparatus.

10 Claims, 3 Drawing Sheets

ELECTRONIC APPARATUS AND A TRANSFER METHOD

BACKGROUND

Field

The invention relates to an electronic apparatus and a transfer method.

Description of the Related Art

Electric signals, electric energy and/or electric data is often transferred between a first electrical device and a second electrical device using a wire. A first connector of the wire is connected with a counterpart connector that is integrated to mechanics of the first electric device, and a second connector at the opposite end of the wire is connected with a counterpart connector that is integrated to mechanics of the second electrical device. The first electrical device may be a mobile phone or a computer, and the second electrical device may be a changer of a battery of the first electric device for transferring electric energy to the first electric device, for example. Alternatively, the second electric device may be a mobile phone or a computer for transferring data to and/or from the first electric device, for example.

The counterpart connector of the first electric device may instead be directly connected with the counterpart connector of the second device which also belongs to a group of wired connections.

Wireless transfer systems have been developed but many times a wired electrical transfer is preferred. However, the wired transfer of electric signals, electric energy and/or electric data requires mechanically and electrically complicated connectors. A failure to direct the connectors to each other properly and/or to use strong enough force to push the connectors in a galvanic contact with each other may lead to a failure in the transfer.

Hence, there is a need to improve the wired transfer of an electric signal, electric energy and/or electric data.

SUMMARY

The present invention seeks to provide an improvement in the wired transfer of electric signals, electric energy and/or electric data.

The invention is defined by the independent claims. Embodiments are defined in the dependent claims.

BRIEF DESCRIPTION OF THE DRAWINGS

Example embodiments of the present invention are described below, by way of example only, with reference to the accompanying drawings, in which.

DETAILED DESCRIPTION

The following embodiments are only examples. Although the specification may refer to "an" embodiment in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned. All combinations of the embodiments are considered possible if their combination does not lead to structural or logical contradiction.

It should be noted that while Figures illustrate various embodiments, they are simplified diagrams that only show some structures and/or functional entities. The connections shown in the Figures may refer to logical or physical connections. It is apparent to a person skilled in the art that the described electronic apparatus may also comprise other functions and structures than those described in Figures and text. It should be appreciated that details of some functions, structures, and the signalling used for measurement and/or controlling are irrelevant to the actual invention. Therefore, they need not be discussed in more detail here.

Figure 1:
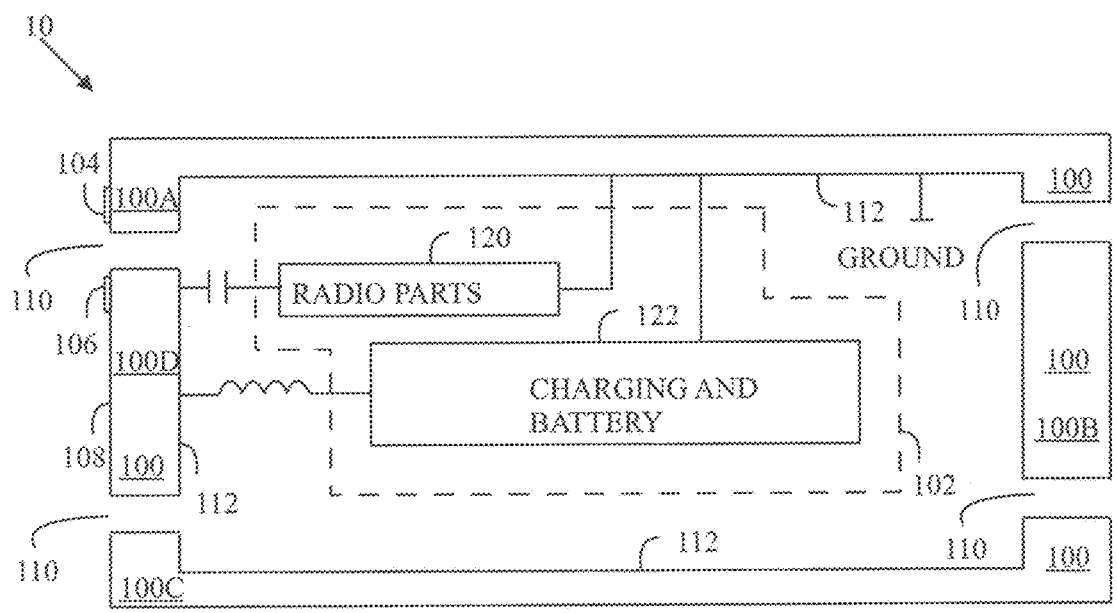
FIG. 1 illustrates an example of an electronic apparatus.

FIG. 1 presents an electronic apparatus 10 which may be a mobile phone or a computer or the like, for example. The electronic apparatus 10 has a case 100 that protects the contents of the electronic apparatus 10 from external mechanical impacts and/or electric disturbance. The case 100 may also mean a container, a frame or a cover of the electronic apparatus 100. The case 100 may be a surface or outer layer of the electronic apparatus 10. The contents may include an internal electric circuitry 102, mechanical parts, optical components or the like, for example. The electronic apparatus 10 may comprise a user interface through which a user may receive and/or input information and the user may control the apparatus 10 but it is not shown in Figures. The user interface may comprise a keyboard and a screen and/or a touch screen. Additionally, the user interface may comprise a loud speaker and/or a microphone.

The case 100 comprises two or more parts 100A, 100B, 100C, 100D of electrically conductive material, the parts 100A to 100D being electrically insulated from each other. The parts 100A to 100D may include metal, electrically conductive composite and/or electrically conductive plastic, for example. The parts 100A to 100D may be made of aluminum, magnesium and/or titanium, for example. The electrically insulated gaps 110 between the parts 100A, 100B, 100C, 100D of electrically conductive material may be filled with electrically insulating material such as insulating polymer, for example. The insulating polymer may be electrically insulating plastic, for example. The gaps 110 may be about 1 mm to 5 mm thick, for example i.e. a distance between the parts 100A, 100B, 100C, 100D of electrically conductive material directly adjacent to each other may be said about 1 mm to 5 mm without limiting to an individual value in this range or without limiting to this range in general.

In an embodiment, the case 100 may be made of the electrically conductive material excluding the electrically insulating material of the gaps 110. In an embodiment, the parts 100A, 100B, 100C, 100D of the case 100 may be covered with a layer of the electrically conductive material. The material of the case 100 under the covering of electrically conducting material may be electrically insulating. The material of the case 100 under the covering of electrically conducting material may be the same as or different from the material of the gaps 110. In an embodiment, the layer of electrically conductive material on the surface of the parts 100A to 100D may be used as an antenna, for example. In an embodiment, the layer of electrically conductive material may be used as an electrostatic shield, for example.

The two or more parts 100A to 100D of the case 100 are electrically coupled with an electric circuitry 102 of the electronic apparatus 10. In an embodiment, at least two of the parts 100A to 100D may be electrically coupled with power supply lines of opposite poles. Thus, different parts 100A to 100D may be coupled to different electrical potentials i.e. different voltages although the coupling may not necessarily be at the poles themselves at which operational power is fed. In an embodiment, at least two of the parts 100A to 100D may be electrically coupled with different poles of power supply lines. There may be two poles, which are opposite to each other: an electrically positive pole of a positive DC voltage potential (DC is abbreviation of direct current) and an electrically negative pole of a negative DC voltage potential. There may also be three poles: an electrically positive pole of a positive DC voltage potential, an electrically negative pole of a negative DC voltage potential and a pole therebetween that is often a zero voltage potential. The pole may also refer to a terminal. Physically, a pole or terminal may a pin, for example.

The electric circuitry 102 may comprise radio parts 120, which may comprise a mixer for mixing a base band signal into a radio frequency signal to be transmitted from an antenna as a radio frequency signal of electromagnetic radiation. In this manner, the electronic apparatus 10 may transmit and receive wirelessly electromagnetic radiation. At least one of the parts 100A to 100D of the case 100 may be used as an antenna for transmitting the radio frequency signal. An electric circuit of the radio part 120 and the parts 100A to 100D of the case 100 may comprise a capacitive coupling, which is represented using a symbol of a capacitor in FIG. 1. The capacitive coupling does not pass DC electric power between the parts 100A to 100D and the radio parts 120.

The electric circuitry 102 may comprise a charging circuit and a battery 122. An electric circuit of the charging circuit and the battery 122 and the parts 100A to 100D of the case 100 may include an inductive coupling, which is represented using a symbol of an inductor or coil in FIG. 1. The inductive coupling passes DC electric power between the parts 100A to 100D and the charging circuit and the battery 122.

A first (for example 100A) of the two or more parts 100A to 100D of the case 10 has at least one electric contact area 104 on an outer surface 108 of said first of the two or more parts 100A to 100D. The outer surface 108 refers to an outer surface of the electronic apparatus 10, and an inner surface 112 refers to an inner surface of the electronic apparatus 10. A second of the two or more parts 100A to 100D has at least one electric contact area 106 on the outer surface 108 of said second of the two or more parts 100A to 100D. The at least one electric contact area 106 may be at the same level as its surroundings. Therefore, in an embodiment, the least one electric contact area 106 is not higher or lower, at least substantially, than any point directly adjacent it, said point belonging to a part 100A to 100D on which said the least one electric contact area 106 is. In an embodiment, the least one electric contact area 106 is higher or lower than any point directly adjacent it, said point belonging to a part 100A to 100D on which said point is.

Figure 2:
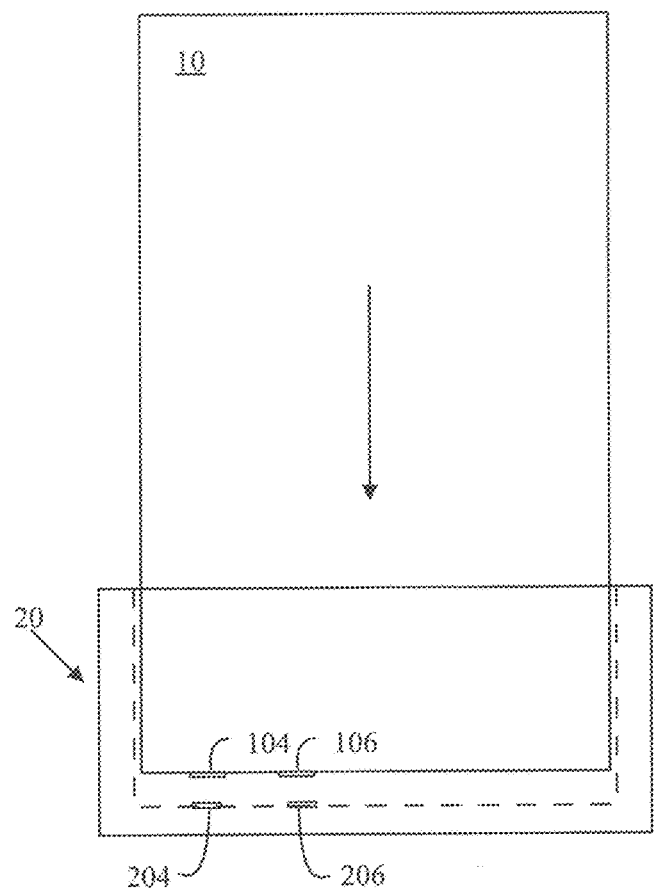
FIG. 2 illustrates an example of the electronic apparatus and its counterpart apparatus.

FIG. 2 illustrates an example where the electronic apparatus 10 is coupled with or inserted into a counterpart apparatus 20. The counterpart apparatus 20 may be a part of wired charger or a part of a wired communication device, the word "wired" referring here to a galvanic contact between areas 104, 106 and 204, 206, respectively. Namely, the electric contact areas 104, 106 become electrically coupled with external electric counterpart contact areas 204, 206 of the counterpart apparatus 20 when the electronic apparatus 10 is coupled with or inserted into the counterpart apparatus 20. The arrow in FIG. 2 illustrates an example where the electronic apparatus 10 is being inserted into a charging cradle, the charging cradle being the counterpart apparatus 20. The electrical contact between the electric contact areas 104, 106 and the counterpart contact areas 204, 206 enables a transfer of electric signals, electric energy and/or electric data to and/or from the electronic apparatus 10. The electric signals, electric energy and/or electric data may be transferred between the electronic apparatus 10 and the counterpart apparatus 20 in only either direction or in both directions.

In an embodiment, the electric contact areas 104, 106 may mean that the whole surface area of the parts 100A to 100D of the case 10 may be electrically conducting. Then the electric signals, electric energy and/or electric data may flow on, in and/or through each of the parts 100A to 100D to and/or from the electric circuitry 102. That something is electrically conducting means in this document that its ohmic resistance is low. That something is electrically insulating or electrically non-conductive means in this document that its ohmic resistance is high. A person skilled in the art is familiar with electrical conduction and electrical insulation, per se.

In an embodiment, the electric contact areas 104, 106 may cover only a part of the surface area of the parts 100A to 100D while the rest of the surface area of the parts 100A to 100D may be electrically non-conductive. The electrically non-conductive surface may be made on aluminium, magnesium or titanium by anodizing which causes the metal to have an anodized surface i.e. anodized surface layer. The anodized surface may be rubbed such that the electrically conductive material in the inside is discovered, the rubbed area corresponding to the electric contact areas 104, 106. Additionally or alternatively, the electrically non-conductive surface may be made by covering the surface of the parts 100A to 100D of any material with a layer of non-conductive material such as electrically non-conductive polymer such as plastic, for example.

In an embodiment, the electric contact areas 104, 106 may comprise electrically conductive pads, which have an electrical connection to the electrically conductive material of the parts 100A to 100D of the case 10. The pads, which may resemble small plates, may cover only a small section of the surface area of the parts 100A to 100D. The pads may be made of metal that may include copper, steel, aluminium or any alloy of them, for example, without limiting to these metals and alloys. The counterpart contact areas 204, 206 may be similar to what is described of the electric contact areas 104, 106 in this document. However, the contact areas 104, 106 and the counterpart contact areas 204, 206, which actually couple, may have been made alternative manner such that the electric contact areas 104, 106 may be electrically conductive because an anodized surface of the parts 100A to 100D is rubbed, and the counterpart contact areas 204, 206 may have pads, which are located in a hole of an insulating case of the counterpart apparatus 20, for example.

In an embodiment, the at least one contact area (104, for example) of the first of the two or more parts 100A to 100D, and the at least one contact area (106, for example) of the second of the two or more parts 100A to 100D may be electrically coupled with different poles of power supply of the electric circuitry 102 of the electronic apparatus 10.

In an embodiment, the at least one contact area 104 of the first (104, for example) of the two or more parts 100A to 100D may contact with a voltage, and the at least one contact area (106, for example) of the second of the two or more parts 100A to 100D may contact with a different voltage. The different parts 100A to 100D may thus be coupled to different electrical potentials as explained earlier. This arrangement allows charging a battery of the electronic apparatus 10 on the basis of the difference of the voltages through the electric circuitry 102 of the electronic apparatus 10.

In an embodiment, the at least one contact area (104, for example) of the first of the two or more parts 100A to 100D may contact with a higher charging voltage, and the at least one contact area (106, for example) of the second of the two or more parts 100A to 100D may contact with a lower charging voltage.

In an embodiment, the at least one contact area 104 of the first (104, for example) of the two or more parts 100A to 100D may contact with a lower charging voltage, and the at least one contact area (106, for example) of the second of the two or more parts 100A to 100D may contact with a higher charging voltage.

Figure 3:
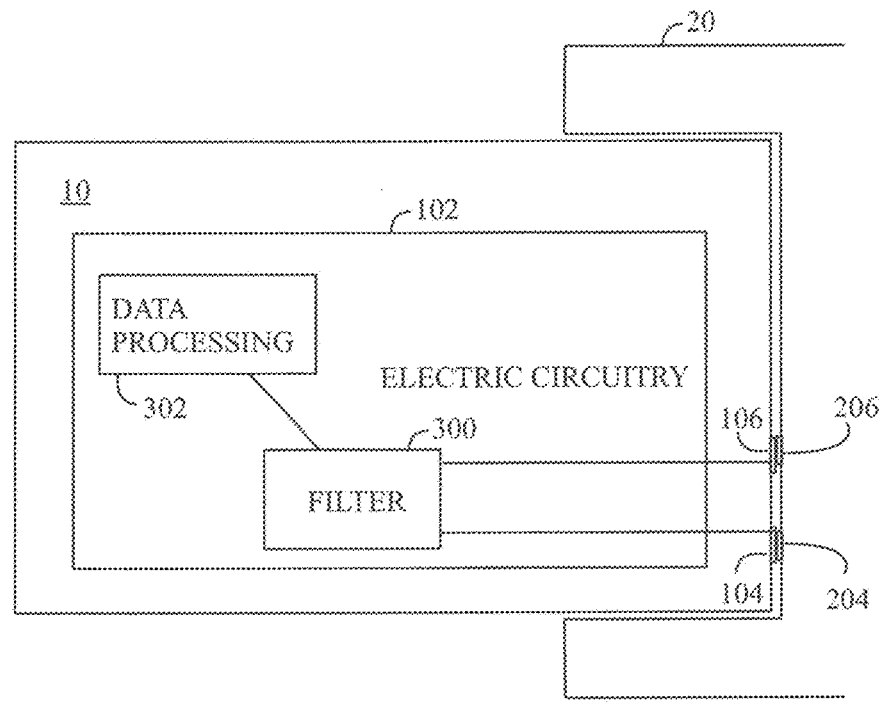
FIG. 3 illustrates an example of a filter in the electronic apparatus.
Figure 4:
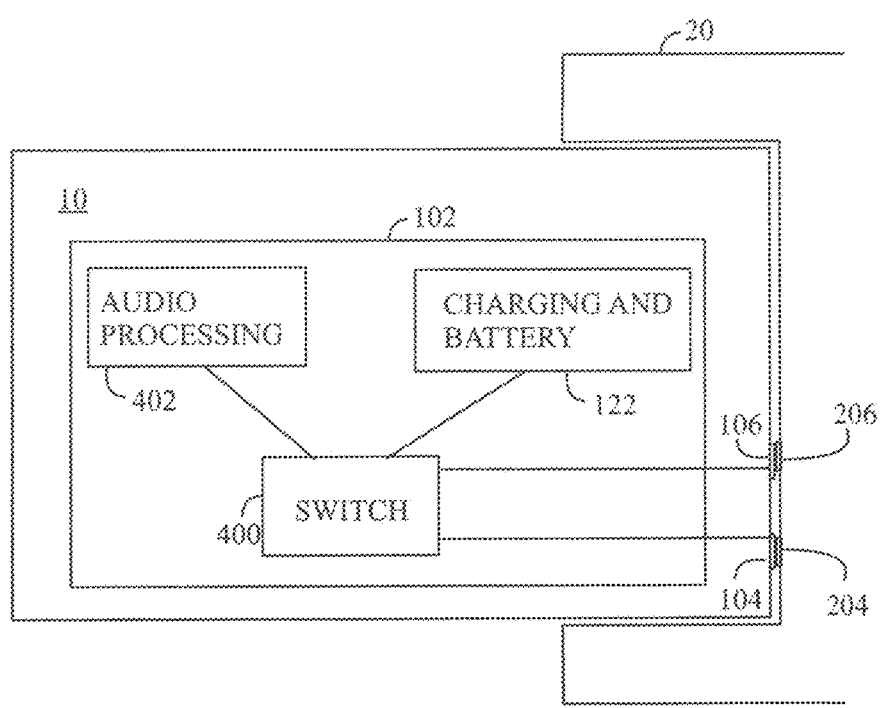
FIG. 4 illustrates an example of a switch in the electronic apparatus.

In an embodiment an example of which is illustrated in FIG. 3, the electric contact areas 104, 106 of the two or more parts 100A to 100D may contact to the counterpart contact areas 204, 106, which may be for external data transfer. The electric circuitry 102 of the electronic apparatus 10 may comprise a filter 300 that may perform at least one of the following: separate data from the electric power, and mix the data with the electric power. By separating data from the electric power, data may be transferred from the counterpart apparatus 20 to a data processing 302 of the electronic apparatus 10. By mixing data to the electrical power, data may be transferred from the electronic apparatus 10 to the counterpart apparatus 20. The data signals may be separated from the radio frequency signals and from the electric DC power by band-pass filtering the data signals.

In an embodiment, the electric contact areas 104, 106 of the two or more parts 100A to 100D of the case 100 may contact to the counterpart contact areas 204, 206 of the counterpart apparatus 20 for transfer of audio signals. The audio signals may be separated from the radio frequency signals and from the electric DC power by band-pass filtering the audio frequency in a manner corresponding to that illustrated in FIG. 3. Then, the filter 300 may perform at least one of the following: separate audio signal from the electric power, and mix the audio signal with the electric power.

In an embodiment, the electric circuitry 102 of the electronic apparatus 10 may comprise a switch 400 that may be used to allow either charging of the battery of the electronic apparatus 10 in the block 122 or transfer of an audio signal related to audio processing 402 through the electric contact areas 104, 106. The switch 400 may be user controllable such that the user may select which of the two is performed.

Figure 5:
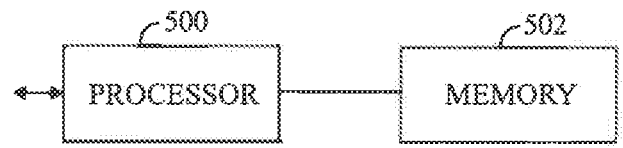
FIG. 5 illustrates an example of at least one processor and at least one memory of the electronic apparatus.

In an embodiment an example of which is illustrated in FIG. 5, the electric circuitry 102 of the electronic apparatus 10 comprises one or more processors 500, and one or more memories 502 including a computer program code. Then the one or more memories 502, the one or more processors 500 and the computer program code may cause the electronic apparatus 10 to control fully or partly operations of the electronic apparatus 10.

In an embodiment, the one or more processors 500, the one or more memories 502 and the computer program code may control the switch 400 for automatically allowing either charging of the battery or transfer of an audio signal through the electric contact areas 104, 106. The switch 400 may be controlled to select either of the operations on the basis of the charging level of the battery, for example.

In an embodiment, the counterpart apparatus 20 of the electronic apparatus 10 comprises the counterpart contact areas 204, 206 that electrically couple with the electric contact areas 104, 106 of the electronic apparatus 10, respectively. In this manner, electric signals, electric energy and/or data may be transferred between the electronic apparatus 10 and the counterpart apparatus 20.

Figure 6:
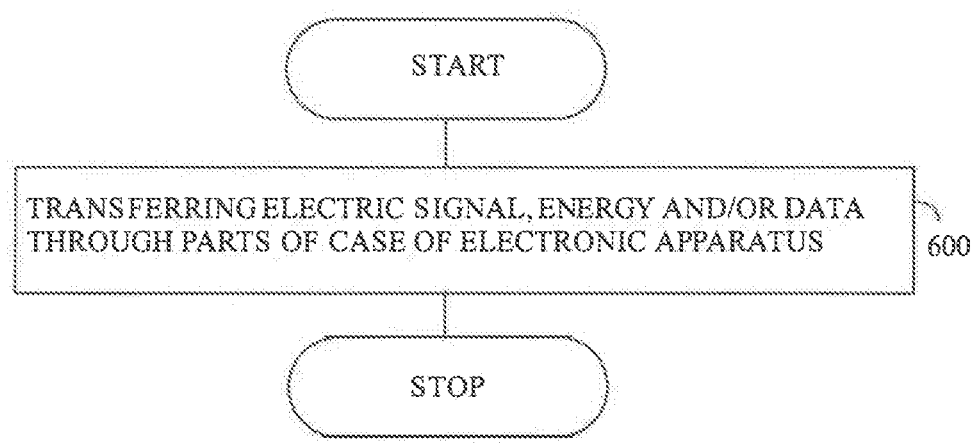
FIG. 6 illustrates of an example of a flow chart of a transfer method.

FIG. 6 illustrates on example of a flow chart of the transfer method. In step 600, an electric signal, electric energy and/or electric data to and/or from the electronic apparatus 10 is transferred through two or more parts 100A to 100D of a case 100 of the electronic apparatus 10 when the two or more parts 100A to 100D are electrically coupled with the counterpart contact areas 204, 206, wherein the parts 100A to 100D are of electrically conductive material, electrically insulated from each other and electrically coupled with electric circuitry 102 of the electronic apparatus 10, and a first of the two or more parts 100A to 100D has at least one electric contact area 104, 106 on an outer surface 108 of said first of the two or more parts 100A to 100D, and a second of the two or more parts 100A to 100D has at least one electric contact area 104, 106 on the outer surface 108 of said second of the two or more parts 100A to 100D.

The method shown in FIG. 6 may be controlled by the at least one processor 500, the at least one memory 502 and the computer code explained in association with FIG. 5.

It will be obvious to a person skilled in the art that, as technology advances, the inventive concept can be implemented in various ways. The invention and its embodiments are not limited to the example embodiments described above but may vary within the scope of the claims.

What is claimed is:

1. An electronic apparatus comprising a case that is configured to form at least one of a surface, outer layer of the electronic apparatus and protect contents of the electronic apparatus from external mechanical impacts and/or electric disturbance, the case comprising two or more parts of electrically conductive material electrically insulated from each other, the two or more parts being electrically coupled with electric circuitry of the electronic apparatus, wherein a first of the two or more parts has at least one electric contact area on an outer surface of said first of the two or more parts, and a second of the two or more parts has at least one electric contact area on the outer surface of said second of the two or more parts, the electric contact areas being configured to electrically couple with external counterpart contact areas for electric signals, electric energy, and/or electric data transfer to and/or from the electronic apparatus.

2. The apparatus of claim 1, wherein the at least one contact area of the first of the two or more parts, and the at least one contact area of the second of the two or more parts are electrically coupled with different poles of power supply of the electric circuitry of the electronic apparatus.

3. The apparatus of claim 1, wherein the at least one contact area of the first of the two or more parts is configured to contact with a voltage, and the at least one contact area of the second of the two or more parts is configured to contact with a different voltage for charging a battery of the electronic apparatus on the basis of the difference of the voltages through the electric circuitry of the electronic apparatus.

4. The apparatus of claim 2, wherein the electric contact areas of the two or more parts are configured to contact to the counterpart contact areas for data transfer, and the electric circuitry of the electronic apparatus comprises a filter configured to perform at least one of the following: separate data from the electric power, and mix the data with the electric power.

5. The apparatus of claim 1, wherein the electric contact areas of the two or more parts are configured to contact with the counterpart contact areas for audio transfer.

6. The apparatus of claim 1, wherein the electric circuitry of the electronic apparatus comprises a filter configured to perform at least one of the following: separate audio signal from the electric power, and mix the audio signal with the electric power.

7. The apparatus of claim 1, wherein the electric circuitry of the electronic apparatus comprises a switch configured to allow either charging of a battery of the electronic apparatus or transfer of an audio signal through the electric contact areas.

8. The apparatus of claim 1, wherein the electronic apparatus comprises:
one or more processors; and
one or more memories including computer program code, the one or more memories and the computer program code configured to, with the one or more processors, at least control operations of the electronic apparatus.

9. The apparatus of claim 1, further comprising a counterpart apparatus, wherein the counterpart apparatus comprises the counterpart contact areas configured to electrically couple with the electric contact areas of the electronic apparatus for electric signals, electric energy and/or data transfer between the electronic apparatus and the counterpart apparatus.

10. A method of transferring electric signals, electric energy and/or electric data to and/or from an electronic apparatus, the method comprising transferring electric signals, electric energy and/or data to and/or from the electronic apparatus through two or more parts of a case of the electronic apparatus when the two or more parts are electrically coupled with external contact counterparts, the case being configured to form at least one of a surface, outer layer of the electronic apparatus, wherein the parts are of electrically conductive material, electrically insulated from each other and electrically coupled with electric circuitry of the electronic apparatus, and a first of the two or more parts has at least one electric contact area on an outer surface of said first of the two or more parts, and a second of the two or more parts has at least one electric contact area on the outer surface of said second of the two or more parts.

* * * * *